Feb. 22, 1927. 1,618,849
M. SCOTT ET AL
DIRECTION INDICATOR ATTACHMENT TO MOTOR VEHICLES
Filed July 30, 1925
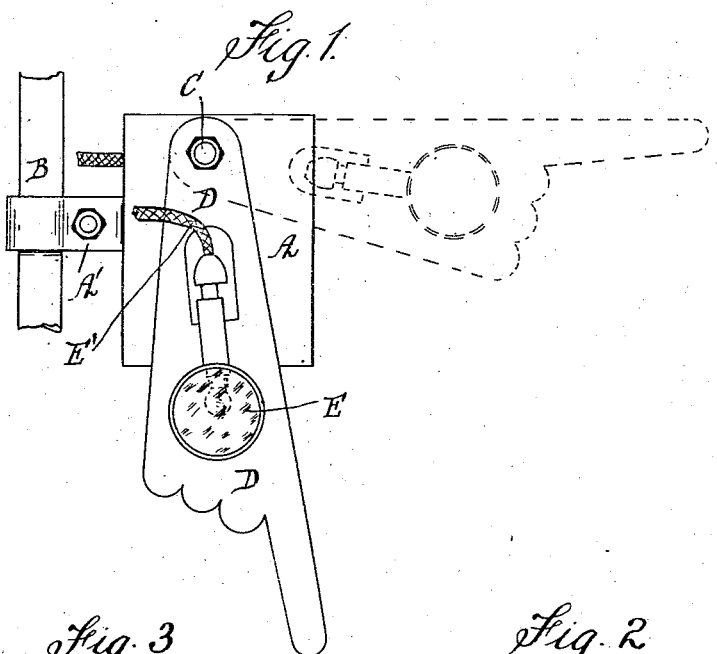
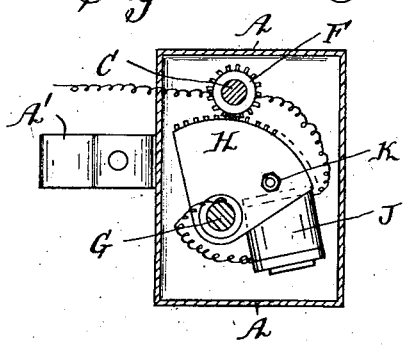
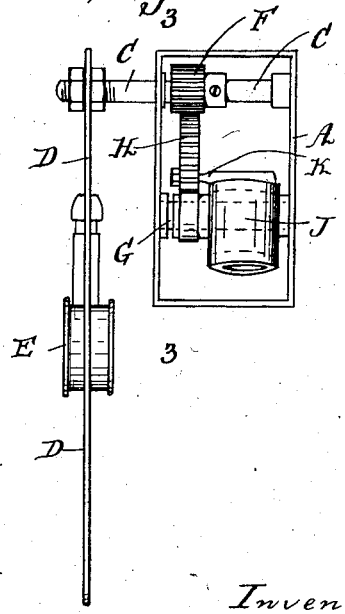
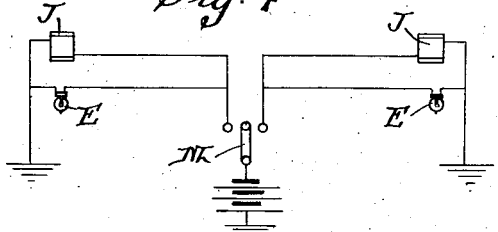
Inventors:
Milton Scott
and John Scott
By
Attorney.

Patented Feb. 22, 1927.

1,618,849

UNITED STATES PATENT OFFICE.

MILTON SCOTT AND JOHN SCOTT, OF NEW PLYMOUTH, NEW ZEALAND.

DIRECTION-INDICATOR ATTACHMENT TO MOTOR VEHICLES.

Application filed July 30, 1925. Serial No. 47,075.

This invention has been devised with the object of providing an improved construction of indicator attachment for a motor vehicle that is designed to be electrically operated by the vehicle driver, and to cause a pointer arm to move from a normal vertically hanging position to a horizontally extending position projecting from the vehicle side. Combined with such pointer arm is an electric lamp that is illumined when the arm is turned out.

The invention covers a form of attachment that is designed to be fitted to one side of the windshield of the vehicle so that its pointer may be projected from that side to indicate the driver's intention of turning in that direction. Consequently, in use, the appliance is duplicated, one being attached to each edge of the windshield and the electric operating means being designed to actuate either at will.

The invention relates more particularly to the means whereby the pointer arm may be controlled and operated so that on an electric circuit being open, the arm will hang vertically by its own weight, and, when the circuit is closed by the operation of a suitable switch, the arm will be swung up and outward and retained there so long as the circuit is closed. The circuit being again opened, the arm will fall down to its normal position.

The construction of the improved attachment and its manner of operation are illustrated in the accompanying drawings and will be hereinafter fully described in relation to such drawings.

In the drawings:—

Figure 1 is a front elevation of the device.

Figure 2 is a side elevation thereof, the cover of a containing casing being removed to expose the mechanism within it.

Figure 3 is a sectional front elevation taken on the line 3—3 of Figure 2.

Figure 4 is a diagram illustrating a suitable system of wiring for the operation of the two indicators of a pair.

In carrying out the invention, a casing A of suitable size to contain the necessary mechanism, is provided. This casing is made of a metal of suitable nature to provide for it forming an "earth" connection with the body of the vehicle, in the well known way characteristic of motor vehicle construction and the fitting of accessories thereto. The casing is provided on its inner side with a spring clip A' that is used for attaching the casing to the side bar B of the windshield frame in order that the casing will be held on the outside of such frame to extend sideways from the vehicle.

A spindle C is provided to extend through the casing near its top, from front to rear, and is suitably journalled to rotate in such front and rear sides. This spindle projects forwardly beyond the casing front and upon its end, a pointer arm D of suitable form, as the pointing finger design shown in Figure 1, is fixed to turn with the spindle. This arm is therefore capable of being turned down as shown by the full lines in Figure 1 or of being turned out at right angles, as shown by the dotted lines in Figure 1.

Fitted into the arm D is an electric lamp frame E having a suitably colored glass cover both on its front and back, and in this frame a lamp bulb is placed and connected up by wire cable E' (left sufficiently loose to permit of the arm turning freely) with the battery system of the vehicle through a switch to be afterwards referred to.

On the spindle C, inside the casing A, a pinion wheel F is fixed.

A second spindle G is mounted in the lower part of the casing to extend from front to back and to turn freely in journals in the walls of the casing. A toothed quadrant H is provided and mounted on such spindle G and this quadrant gears with the pinion F so that by its turning movement, the pinion F and spindle C will be turned correspondingly.

Fixed to the rear side of the quadrant is an electro-magnet J that has one of its ends attached to a bar K extending rigidly from the quadrant at a suitable distance from its axis, and which is arranged at a tangent so that its core or magnet end extends downward to near the bottom of the casing. This electromagnet is wired with the battery system of the vehicle and is earthed through the earthing of the casing. The energizing of this electromagnet causes it to move downwards towards the casing bottom, such casing being of metallic nature and thereby acting as an armature.

The weight of the arm D is such that it will overcome that of the electromagnet and thus provide for the arm hanging vertically under normal conditions. The strength of the electromagnet is however so arranged that it will be capable of overcoming this weight when it moves under its energizing, and will in its movement, turn the quadrant H, which by its gearing with the pinion F will cause the spindle C to turn and swing the arm D to the horizontal position, and hold it there so long as the circuit through the electromagnet is complete. The amount of movement allowed the mechanism is adjusted to provide for the arm moving from the vertical to the horizontal position. When the circuit is broken the parts automatically resume their normal positions.

The circuit through the electromagnet J and also through the lamp E is controlled by any of the known and approved means employed in motor vehicle battery systems, as for instance in the manner shown in Figure 4 in which a switch M mounted in a position convenient to the driver is designed to close circuit with either of the two indicators at will, by movement from a central neutral position. Such arrangement however forms no feature of the invention, as obviously other arrangements for simultaneously closing the electromagnet, and the lamp circuits of either device, may be devised by any ordinary skilled workman and such arrangements will be varied in different classes of vehicles.

We claim:

1. A direction indicator for vehicles comprising a casing of magnetic metal; a spindle mounted in said casing and having a pinion thereon; a pointer arm mounted on said spindle; a second spindle mounted in said casing; a toothed quadrant mounted on said second spindle and adapted to mesh with the pinion; and an electromagnet mounted on said quadrant and adjacent said casing which, when energized, will be attracted to the wall of the casing which acts as an armature in order to actuate the pointer arm by means of the toothed quadrant and the pinion.

2. A direction indicator, comprising a casing of magnetic metal; a pointer arm rotatably mounted therein; and a swingable electromagnet mounted adjacent the casing and attracted by a wall of the latter when energized, whereby it is caused to execute a swinging movement, said magnet being connected with the pointer arm to transmit its swinging movement to said arm.

In testimony whereof, we affix our signatures.

MILTON SCOTT.
JOHN SCOTT.